United States Patent [19]

Steen et al.

[11] Patent Number: 4,803,335

[45] Date of Patent: Feb. 7, 1989

[54] GAS SHROUD AND METHOD

[75] Inventors: William M. Steen, Surrey, Great Britain; Vijitha M. Weerasinghe, London, England

[73] Assignee: Quantum Laser Corporation, Edison, N.J.

[21] Appl. No.: 56,771

[22] Filed: Jun. 2, 1987

[30] Foreign Application Priority Data

Jan. 7, 1987 [EP] European Pat. Off. ........ 87300086.3

[51] Int. Cl.$^4$ .............................................. B23K 26/14
[52] U.S. Cl. ............................ 219/121.84; 219/121.6; 219/121.65
[58] Field of Search ................. 219/121.84, 121.63, 219/121.64, 121.65, 121.66, 121.12, 121.13, 121.14, 121.35, 121.6, 121.85, 72

[56] References Cited

U.S. PATENT DOCUMENTS

| | | | |
|---|---|---|---|
| 3,499,137 | 3/1970 | Meulemans | 219/72 |
| 3,600,065 | 8/1971 | Law | 219/121.84 X |
| 3,866,398 | 2/1975 | Vernon, Jr. et al. | 156/17 |
| 3,994,429 | 11/1976 | Hallenbeck et al. | 228/57 |
| 4,005,305 | 2/1977 | Nelson et al. | 219/72 |
| 4,029,930 | 6/1977 | Sagara et al. | 219/72 X |
| 4,052,632 | 10/1977 | Sagara et al. | 219/137 R |
| 4,149,062 | 11/1979 | Limmer et al. | 219/121 L |
| 4,172,974 | 10/1979 | Stingelin et al. | 219/72 |
| 4,254,321 | 3/1981 | Hallenbeck | 219/72 |
| 4,288,678 | 9/1981 | LaRocca | 219/121.84 X |
| 4,314,521 | 2/1982 | Lundberg | 219/72 X |
| 4,347,785 | 9/1982 | Chase et al. | 101/1 |
| 4,447,701 | 5/1984 | Brown | 219/121 LG |
| 4,461,947 | 7/1984 | Ward | 219/121 FS |
| 4,564,135 | 1/1986 | Barregi et al. | 228/6.2 |

FOREIGN PATENT DOCUMENTS

| | | |
|---|---|---|
| 0077855 | 2/1980 | European Pat. Off. . |
| 2455806 | 5/1976 | Fed. Rep. of Germany ........ 219/72 |
| 2450660 | 3/1980 | France . |
| 2046801 | 11/1980 | United Kingdom . |

Primary Examiner—C. L. Albritton
Attorney, Agent, or Firm—Shlesinger, Arkwright & Garvey

[57] ABSTRACT

A gas shroud comprises a chamber having a beam inlet, a gas inlet and an outlet portion. A shroud having an inner surface and an outer surface is operably associated with the outlet portion and is rotatable relative to the chamber. A drive system is operably connected to the shroud for rotating the shroud. A plurality of fins are positioned about the outer surface of the shroud and are rotatable therewith so that rotation of the shroud causes the environment surrounding the shroud to be expelled radially away therefrom.

41 Claims, 2 Drawing Sheets

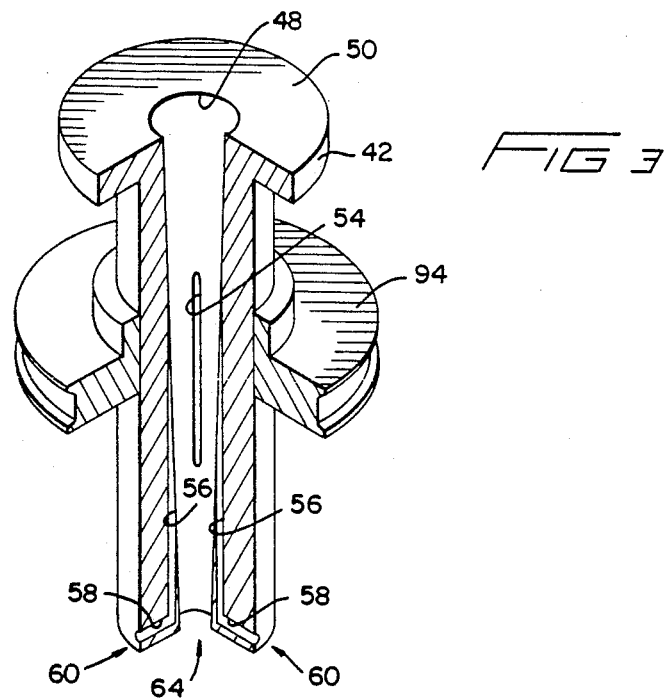
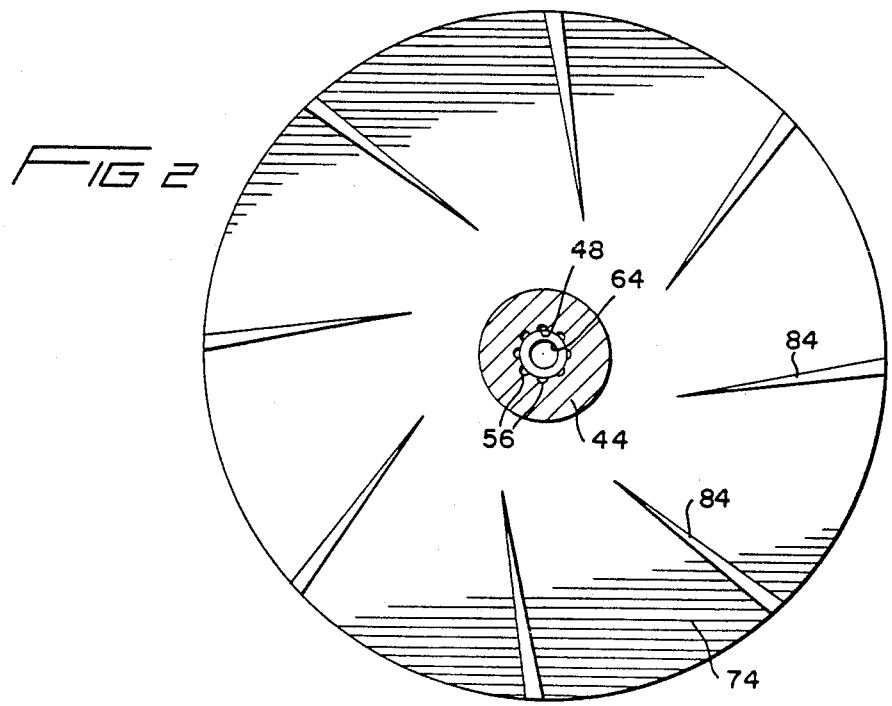

GAS SHROUD AND METHOD

BACKGROUND OF THE INVENTION

The welding or must high temperature processing of metals, such as steel, must frequently be performed within a carefully controlled environment if any one of a number of matrix altering effects is to be avoided, or is to be permitted. For example, oxidation of the heated surface caused by reaction with ambient air can be avoided by shrouding the work site with a non-reactive gas, such as argon or helium. Likewise, shrouding can be used to prevent detrimental absorption of gases, such as hydrogen, which are present in a moist ambient atmosphere. Shrouding may also be used to introduce a particular gas which is to react with the heated surface in order to modify certain properties thereof.

Shrouding of the work site is normally accomplished by positioning a bowl-like shroud adjacent the work site. The rim of the shroud is normally positioned closely proximate a surface of the workpiece in order to prevent too much of the shrouding gas from prematurely escaping, and thereby unnecessarily increasing the amount of shrouding gas required. The shrouding gas is normally introduced axially parallel to the energy source. The work site area may also be simply blown with one or more jets of shrouding gas. Unfortunately, these jets typically entrain the surrounding environment as they proceed toward the work site area.

Commercial processing, such as welding and the like, of metals is normally performed on a relatively large scale. Large scale processing normally requires that there be relative motion between the energy source and the workpiece. This relative motion can be brought about by movement of the energy source, as well as the associated shrouding mechanism, or by movement of the workpiece.

Movement of an object, such as a workpiece, in a particular direction within a fluid, such as the ambient atmosphere, causes a relative fluid motion to be induced over the workpiece surface in the opposite direction. The induced flow can result in contamination of the confined shrouding gas by permitting the surrounding fluid environment to be introduced into the shroud, and thereby contaminating the shroud environment. High jet velocities have been used as one means for reducing contamination when relatively high processing speeds are required. High jet velocities can be detrimental, however, by affecting the flow of the molten material within the heated area. Molten metal flow abnormalties can be particularly detrimental in applications such as cladding of the workpiece by laser processing and the like.

The disclosed invention is a gas shroud and method which is particularly suitable for situations wherein there is relative motion between the energy source and the workpiece. The disclosed invention incorporates a shroud which is rotatable on an axis for causing the ambient environment to be expelled radially away for thereby offsetting the induced fluid motion.

OBJECTS AND SUMMARY OF THE INVENTION

The primary object of the disclosed invention is a gas shroud and method which offsets the induced fluid motion of the surrounding environment by causing that environment to be expelled radially away from the shroud.

The disclosed invention is a gas shroud comprising a chamber having a laser beam inlet, a surrounding gas inlet and an outlet. The shroud is operably associated with the outlet and is rotatable on an axis and is rotatable relative to the chamber. A belt drive system is connected with the shroud for causing the shroud to rotate. A plurality of fins are mounted to the shroud, and are rotatable therewith, so that rotation of the fins causes a radially outwardly directed gas flow preventing the surrounding environment from entering the shroud. The gas flow has a velocity sufficient to offset the induced fluid motion caused by the motion of the workpiece relative to the energy source. The gas flow establishes a pressure gradient across the shroud/environment boundary.

Applicants have found that the apparatus and method of the invention are more efficient than simply blowing shrouding gas into a fixed orientation shroud. The shrouding gas velocities can be reduced, therefore resulting in a reduced need for shrouding gas. Also, reduced shrouding gas velocities results in the molten pool being more tranquil, a feature particularly beneficial in the laser cladding, surface alloying or surface melting of metals with a laser beam.

These and other objects and advantages of the invention will be readily apparent in view of the following description and drawings of the above described invention.

DESCRIPTION OF THE DRAWINGS

The above and other objects and advantages and novel features of the present invention will become apparent from the following detailed description of the preferred embodiment of the invention illustrated in the accompanying drawings, wherein:

FIG. 2 is a cross-sectional view taken along the section 2—2 of FIG. 1 and viewed in the direction of the arrows; and FIG. 3 is a perspective view, partially in section, disclosing the nozzle and drive mechanism of the invention.

DESCRIPTION OF THE INVENTION

Figure 1:
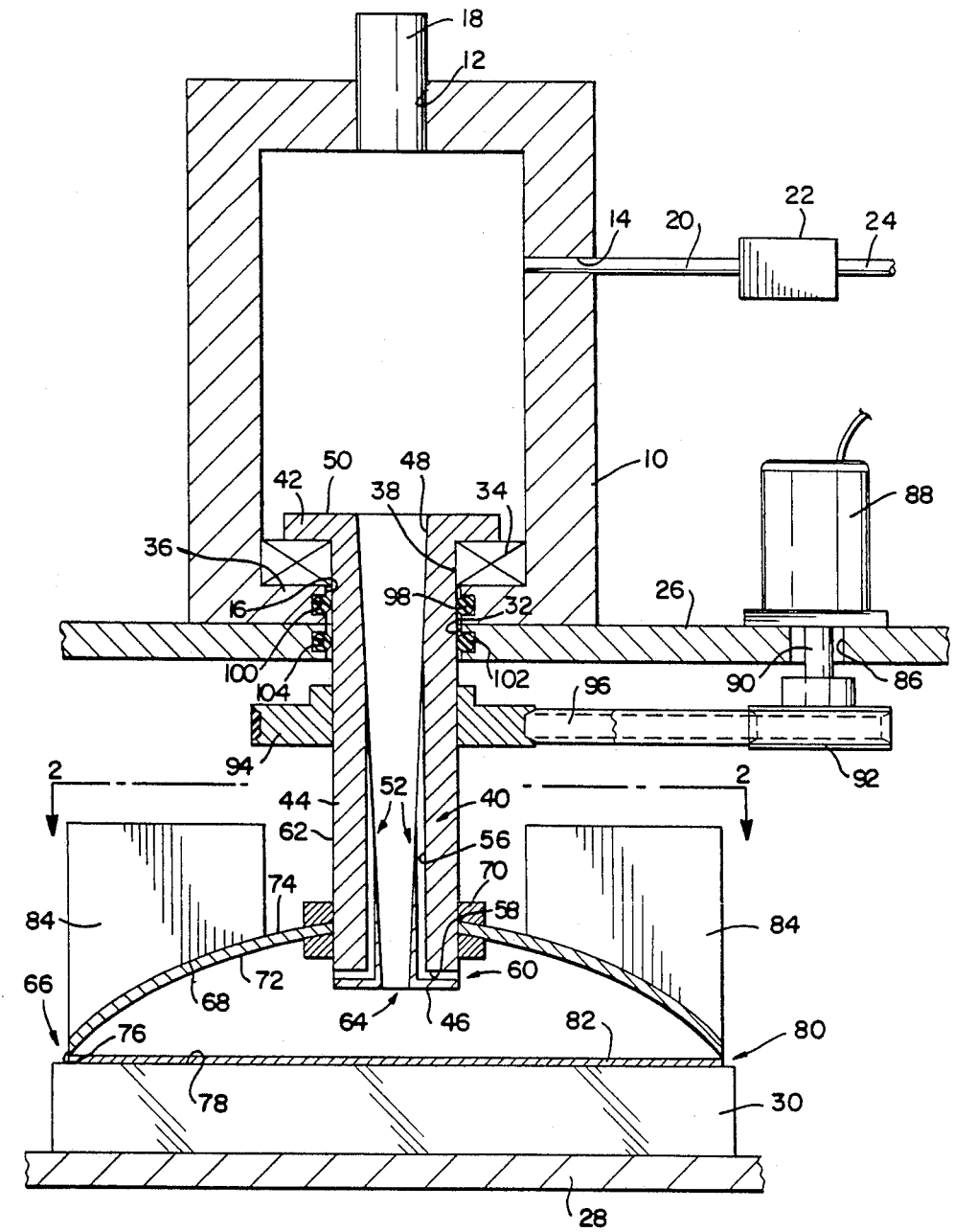
FIG. 1 is a cross-sectional view disclosing the rotatable shroud and related assemblies of the invention.

Chamber 10, as best shown in FIG. 1, is a walled body having a beam inlet 12 and a shrouding gas inlet 14. Chamber 10 furthermore includes an outlet 16 which is, preferably, coaxial with inlet 12. The beam inlet 12 furthermore includes laser beam inlet assembly 18 for causing a laser beam, or other similar high energy directed beam, to be introduced within chamber 10 through inlet 12. Naturally, assembly 18 includes the power source, optics and the like for use with a laser beam. Gas inlet 14 includes gas supply duct 20 which is connected to pressure regulator assembly 22 and ultimately to a source of shrouding gas (not shown) through duct 24.

The chamber 10 rests upon support 26 which extends generally parallel to spaced apart table assembly 28. Table assembly 28 supports workpiece 30 which is operated upon by the laser beam introduced through beam inlet assembly 18. The workpiece 30 is caused to move relative to chamber 10 by means (not shown) incorporated within the table assembly 28. Alternatively, the chamber 10 may be moved relative to the workpiece 30 by other means not here shown. Support 26 has an opening 32 therein which is coaxial with outlet 16, for reasons to be explained herein.

Bearing assembly 34 is mounted within chamber 10, preferably resting on bottom wall 36 thereof, and includes a central opening 38 which is coaxial with the openings 16 and 32. Nozzle 40 has a first end portion provided by flange 42. Flange 46 is rotatably supported by bearing 34. Nozzle 40 includes a generally cylindrical body 44 which extends from flange 42 through the aligned openings 38, 16 and 32 and terminates in bottom wall portion 46 spaced some distance from support 26.

Bore 48 extends from upper wall portion 50 of flange 42 through bottom wall portion 46. Preferably, the bore 48 is tapered in a manner conforming to the focusing of the laser beam as controlled by the beam inlet assembly 18. In this way, the bore 48 has a diameter at the inlet thereof in the upper wall portion 50 which exceeds the diameter at the outlet thereof in the lower portion 46. The configuration of the bore 48 is selected to achieve the smallest diameter consistent with the decreasing beam diameter in order to prevent processing smoke and the like from infiltrating upwardly through the bore 48. In this way, the smoke and other like contaminants are prevented from impinging upon or otherwise clouding the optics of the beam inlet assembly 18.

The nozzle 40 has a plurality of equiangularly disposed gas bores 52 which permit the shrouding gas to be communicated from the chamber 10 through the nozzel 40. Each of the gas bores 52 has an inlet defined by a longitudinally extending slot 54 which communicates with the bore 48 intermediate the end wall portions 50 and 46. The gas bores 52 each have a duct 56 extending from the inlet slot 54 generally parallel to the axis of the nozzle 40. Each of the ducts 56, preferably, terminates short of the lower wall portion 46 and a duct 58 extends therefrom generally transverse to the axis and terminates in an opening 60 extending through side wall 62 of body 44. In this way, the gas bores 52 have an L-shaped configuration, although those skilled in the art will understand that other configurations may be appropriate. Also, it shoudl be recognized that some of the shrouding gas discharges through the outlet 64 of the bore 48, although a substantial portion of the shrouding gas exits through the outlets 60.

Shroud 66 includes a shield 68 which is secured to the nozzle 40 above the outlets 60 and 64. Preferably, a lock ring 70 is secured to the nozzle 40 and clamps the inner and outer surfaces 70 and 72, respectively, of the shield 68 therebetween and to sidewall 62. The lock ring 70 provides a gas tight seal around the nozzle 40. In this way, the shrouding gas is confined by the inner surface 72 and remains within the area of the work site as defined by the focus point of the laser beam.

It can be noted in FIG. 1 that the shield 68 is arcuate and preferably is a portion of a hemisphere. The shield 68 has a peripheral rim 76 which is disposed closely adjacent the surface 78 of the workpiece 30. Preferably, the rim 76 is sufficiently close to the surface 78 to prevent the shrouding gas from readily escaping from beneath the shroud 66. The gap 80 between the rim 76 and the surface 78 may, in certain circumstances, be filled by resilient brush 82 to further prevent escape of hte shrouding gas from the shroud 66.

FIns 84 are equiangularly disposed about outer surface 74 and extend axially therefrom. It can be noted in FIG. 2 that the fins 84 are directed in an offset relationship relative to the center of the shield 68. Also, the fins 84 are triangular in plan and taper from periphery 76 toward the terminus of the fin. Although 8 fins 84 are shown in FIG. 2, those skilled in the art will understand that a greater or lesser number may be required in a particular instance. Also, while the fins 84 are shown as extending axially, it is likewise envisioned that other configuruations are possible without departing from the scope of the invention.

Support 26, as best shown in FIG. 1, has an opening 86 therein which is spaced from the opening 32. Motor 88 is mounted to support 26 and has a rotatable shaft 90 extending therefrom through the opening 86. Drive pulley 92 is secured to shaft 90 and is rotatable therewith. A driven pulley 94 is secured to nozzle 40 intermediate wall portions 46 and 50. Belt 96 trains about and extends between the pulleys 92 and 94, so that rotation of the pulley 92 causes corresponding rotation of the pulley 94, and hence of the nozzle 40. The bearings 34 permit the nozzle 40 to rotate freely within the apertures 16 and 32.

Preferably, opening 16 includes a resilient seal 98 positioned within recess 100 and engaged with the sidewall 62, for preventing the shrouding gas from leaking from the chamber 10 upon rotation of the nozzle 40. Similarly, seal 102 is positioned within recess 104 of support 26 for preventing gas leakage during rotation of the nozzle 40.

As previously noted, the shield 68 is secured to the nozzle 40 by means of lock ring 70. The result is that rotation of the nozzle 40 causes corresponding rotation of the shroud 66. The fins 84 are directed and configured so that rotation of the shroud 60 causes the ambient environment surrounding the shroud 66 to be expelled radially away therefrom. In this way, the induced motion of the surrounding environment caused by the relative motion between the workpiece 30 and the shroud 66 is offset and the entry of contaminating gases and the like avoided.

Those skilled in the art will understand that any increase in the speed of the relative motion between the workpiece 30 and the shroud 66 will cause a corresponding increase in the induced motion of the surrounding environment. For this reason, the speed of rotation of the shield 66 is controlled so as to be proportional with the relative speed between the workpiece 30 and the shroud 66. The velocity of the expelled environment is maintained at least equal to, and preferably greater than, the induced motion caused by the relative motion. Otherwise, the surrounding environment will infiltrate through the gap 80 into the shrouded confines defined by the shield 68.

The velocity of the expelled enviroment also has the beneficial effect of creating a driving force operating on the shrouding gas. This driving force causes the shrouding gas to flow through the gap 80. The nominal shrouding gas flow is beneficial as a means for removing smoke and the like, which could otherwise unacceptably contaminate the shrouded environment.

Transverse discharge of the shrouding gas through the outlets 60 is desirable because the shrouding gas impinges on the inner surface 72 and removes dust and other contaminants which could be affixed thereto. The discharge of the shrouding gas therefore causes the inner surface 72 to be kept clean. Also, the transverse discharge helps to maintain the molten work site tranquil, a feature particularly beneficial in laser cladding, surface alloying and surface melting. The high coaxial gas velocities which could cause abnormalities in the molten region are avoided by transverse discharge, resulting in a smoother surface and a better control over the finished product.

The preferred embodiment disclosed herein has the shroud 66 rotated by the nozzle 40. Those skilled in the art will understand that it is important that the shield 66 and its fins 84 be rotated and not, necessarily, that the nozzle 40 rotate. For example, it is just as possible to design a system wherein the shroud 66 is directly connected to a driving mechanism for rotating the shroud 66 while the nozzle 40 remains fixed. Similarly, although a pulley and belt drive rotation mechanism are disclosed, those skilled in the art will understand that there are numerous means for achieving rotation of the nozzle 40, such as chain drive assemblies, stepper motor assemblies and the like.

The fins 84 provide a diverter means for causing the surrounding environment to be expelled radially away from the shroud 66. This diverting function can be performed by a number of mechanisms. For example, the outer surface 74 could be sufficiently roughened in order to perform the functional equivalent of fins for expelling the surrounding environment radially away. Regardless of what is used as the diverting means, it is merely important that the surrounding environment be expelled radially away with sufficient velocity to offset the induced motion of that environment.

OPERATION

Operation of the shroud 66 of the invention proceeds in a manner very much analogous to that of the prior fixed position shrouds. The shroud 66 is initially aligned with the workpiece 30 so that the rim 76 is disposed closely adjacent the surface 78. Those skilled in the art will understand that the outlet 64 will be aligned with an initial starting position on the workpiece 30, from which further processing will proceed. Shrouding gas is introduced through inlet 20, the introduction pressure being regulated by the pressure regulator 22. The motor 88 is then energized, thereby causing the shroud 66 to rotate because of the action of the pulleys 92 and 94. The laser beam is then introduced into the chamber 10 and is directed through the bore 48 towards the work site by the optics within the beam inlet assembly 18. The workpiece 30 is then caused to move relative to the nozzle 40 so that the laser processing can proceed.

As previously noted, the speed of rotation of the shroud 66 is regulated in response to the velocity of the workpiece 30 relative to the outlet 64. Similarly, the pressure regulator 22 acts to maintain a constant shrouding gas pressure within the chamber 10, the pressure in the chamber 10 being proportional to the pressure within the shield 66. Naturally, some shrouding gas is lost through the gap 80 and this shrouding gas is made-up through the duct 24.

The surface 72 of shield 68 is, preferably, reflective so that its reflects light from the work site to any required location within shield 68, usually back to the work site itself.

It is also anticipated that fins or equivalent structure corresponding to fins 84 could also be positioned on inside surface 72 of shield 68. In such case, the fins would extend axially inwardly, as opposed to extending outwardly from surface 74. In fact, the fins 84 could be eliminated. Internal fins could be used to offset induced flow of the environment if sufficiently rotated. Contamination of the shield environment would therefore be prevented. Additionally, the internal fins would produce a disturbance in the hot plasma field which is desirable in certain applications. The disturbance would permit better penetration by the welding beam, without causing disturbance of the molten pool.

While this invention has been described as having a preferred design, it is understood that it is capable of further modifications, uses and/or adaptations of the invention following in general the principle of the invention and including such departures from the present disclosure has come within known or customary practice in the art to which the invention pertains, and as may be applied to the central features hereinbefore set forth, and fall within the scope of the invention of the limits of the appended claims.

What we claim is:

1. A workpiece shroud, comprising:
   (a) chamber means including a beam inlet, a fluid inlet and an outlet portion;
   (b) shield means operably associated with said outlet portion and being rotatable relative to said chamber means;
   (c) drive means operably associated with said shield means for rotating said shield means; and,
   (d) diverter means operably associated with said shield means and rotatable therewith so that rotation of said diverter means causes a radially outwardly directed gas flow preventing the environment surrounding said shield means from entering said shield means.

2. The shroud of claim 1, wherein:
   (a) said outlet portion being rotatable; and,
   (b) said shield means being carried by said outlet portion and being rotatable therewith.

3. The shroud of claim 1, wherein:
   (a) said outlet portion including a nozzle, said nozzle having a first end portion positioned within said chamber means and a second end portion positioned exteriorly of said chamber means; and,
   (b) said shield means carried by said second end portion.

4. The shroud of claim 3, wherein:
   (a) said nozzle being rotatable; and,
   (b) said shield means being secured to said nozzle and rotatable therewith.

5. The shroud of claim 4, wherein:
   (a) said drive means being operably connected to said nozzle intermediate said end portions.

6. The shroud of claim 1, wherein:
   (a) said diverting means including a plurality of fins secured to an outer surface of said shield means.

7. The shroud of claim 1, wherein:
   (a) said drive means including driver means and driven means; and,
   (b) said driven and driver means being operably interconnected so that operation of said driver means causes associated operation of said driven means.

8. The shroud of claim 7, wherein:
   (a) said outlet portion including a nozzle rotatable relative to said chamber means;
   (b) said shield means being operably connected to said outlet portion and rotatable therewith; and,
   (c) said driven means being operably connected to said nozzle for causing rotation thereof.

9. The shroud of claim 8, wherein:
   (a) said driver means including a motor operated first pulley and said driven means including a second pulley; and,
   (b) linkage means interconnecting said pulleys.

10. The shroud of claim 1, wherein:
(a) said outlet portion including a nozzle having a first end portion associated with the interior of said chamber means and a second end portion disposed exteriorly of said chamber means;
(b) a bore being centrally disposed within said nozzle and extending between said end portions so that a beam may pass through said nozzle; and,
(c) at least a first gas bore in said nozzle and said gas bore having an outlet in said second end portion for evacuating a gas from said chamber means.

11. The shroud of claim 10, wherein:
(a) said gas bore having an inlet communicating with said bore.

12. The shroud of claim 11, wherein:
(a) said shield means being secured to said nozzle above said bore outlet; and,
(b) said gas bore having said outlet thereof proximate said bore outlet.

13. The shroud of claim 12, wherein:
(a) said gas bore having a first portion extending generally parallel to said bore and a second portion extending generally transverse thereto and said gas bore outlet being aligned with said second portion.

14. The shroud of claim 10, wherein:
(a) a plurality of gas bores being equiangularly disposed about said nozzle.

15. The shroud of claim 10, wherein:
(a) said first end portion including a flange positioned within said chamber; and,
(b) bearing means being disposed between said flange and said chamber means for permitting rotation of said nozzle.

16. The shroud of claim 1, wherein:
(a) said shield means being a portion of a hemisphere facing away from said chamber means.

17. The shroud of claim 10, wherein:
(a) said beam inlet being coaxial with said bore.

18. The shroud of claim 1, wherein:
(a) gas pressure control means being operably associated with gas inlet for controlling the pressure of a gas within said chamber means.

19. The shroud of claim 17, wherein:
(a) said gas inlet extending generally transverse to said beam inlet.

20. A laser shroud, comprising:
(a) a chamber having a laser beam inlet, a gas inlet and an outlet;
(b) a nozzle having a first end portion operably connected with said chamber and said nozzle extending from said outlet and terminating in a second end portion;
(c) a bore in said nozzle providing an inlet and an outlet therefor so that a laser beam and a gas may pass from said chamber toward a workpiece;
(d) an arcuate shroud operably connected to said nozzle above said nozzle outlet so that the gas issuing from said nozzle is confined by said shroud, said shroud being rotatable relative to said chamber;
(e) drive means operably associated with said shroud for causing rotation thereof; and,
(f) diverter means carried by said shroud and rotatable therewith so that rotation thereof causes an environment surrounding said shroud to be expelled generally radially away therefrom.

21. The shroud of claim 20, wherein:
(a) said nozzle being rotatable relative to said chamber; and,
(b) said drive means being operably connected to said nozzle for rotating said nozzle and thereby said shroud.

22. The shroud of claim 21, wherein:
(a) said drive means being connected to said nozzle intermediate said first and second end portions.

23. The shroud of claim 21, wherein:
(a) said drive means including a driven element and a driver element and said elements being operably interconnected so that operation of said driver element causes cooperating operation of said driven element; and,
(b) said driven element being operably connected to said nozzle for causing rotation thereof.

24. The shroud of claim 23, wherein:
(a) said driver element including a first pulley and means for rotating said first pulley;
(b) said driven element including a second pulley; and,
(c) continuous linkage means being trained about said pulleys for causing associated rotation thereof.

25. The shroud of claim 20, wherein:
(a) said nozzle having a longitudinal axis and said nozzle outlet being coaxial with said axis; and,
(b) said nozzle including a plurality of gas bores, each of said gas bores having an outlet angularly disposed relative to said bore outlet.

26. The shroud of claim 25, wherein:
(a) said first end portion including a first endwall and said second end portion including a second endwall;
(b) said bore extending through said endwalls; and,
(c) said gas bore outlets extending through a sidewall extending between said endwalls.

27. The shroud of claim 26, wherein:
(a) each of said gas bores having a first portion extending parallel to said axis and a second portion extending generally transverse thereto.

28. The shroud of claim 27, wherein:
(a) each of said gas bores having an inlet thereof communicating with said bore and said gas bore inlets being intermediate said endwalls.

29. The shroud of claim 28, wherein:
(a) said bore being tapered and the bore diameter at said inlet thereof exceeds the diameter at said outlet thereof.

30. The shroud of claim 25, wherein:
(a) said laser beam inlet being coaxial with said nozzle axis.

31. The shroud of claim 25, wherein:
(a) bearing means being disposed between said first end portion and said chamber for permitting free rotation of said nozzle; and,
(b) seal means being disposed about said chamber outlet in engagement with said nozzle and said seal means being coaxial with said laser beam inlet.

32. The shroud of claim 20, wherein:
(a) said shroud being a portion of a hemisphere having a radius spaced longitudinally away from said chamber; and,
(b) said shroud having an inner surface and an outer surface and said diverter means extending from said outer surface.

33. The shroud of claim 32, wherein:
(a) said diverter means including a plurality of fins equiangularly disposed about said shroud.

34. The method of operating on a workpiece within a controlled environment, comprising the steps of:
(a) positioning a rotatable shroud adjacent a workpiece;
(b) confining a fluid between shroud and the workpiece;
(c) operating on the workpiece within the area confined by said shroud; and,
(d) rotating said shroud and causing the environment surroudnign said shroud to be expelled radially away therefrom.

35. A method of claim 34, including the step of:
(a) operating on the workpiece by directing a laser beam at a selectyed spot on the workpiece.

36. The method of claim 34, including the step of:
(a) supplying the fluid through said shroud.

37. The method of claim 34, including said steps of:
(a) operating on the workpiece by directing a laser beam at a selected spot on the workpiece;
(b) supplying the fluid through said shroud and the fluid being a gas; and,
(c) admitting the laser beam and a portion of the gas through a common opening in said shroud.

38. The method of claim 37, including the step of:
(a) admitting a portion of the gas through an opening which extends generally transverse to said common opening.

39. The method of claim 34, including the step of:
(a) moving the workpiece relative to said shroud.

40. The method of claim 39, including the step of:
(a) rotating said shroud at a speed which is proportional to the relative velocity between said shroud and the workpiece.

41. A workpiece shroud, comprising:
(a) chamber means including a beam inlet, a fluid inlet and an outlet portion;
(b) shield means operably associated with said outlet portion and being rotatable relative to said chamber means;
(c) drive means operably associated with said shield means for rotating said shield means; and,
(d) diverter means operably associated with said shield means and rotatable therewith so that rotation of said diverter means generates a pressure gradient opposing the flow of the environment surrounding said shield means and prevents the environment from entering under said shield means.

* * * * *